No. 864,221. PATENTED AUG. 27, 1907.
W. H. BAKER.
CAR STAKE.
APPLICATION FILED DEC. 29, 1906.
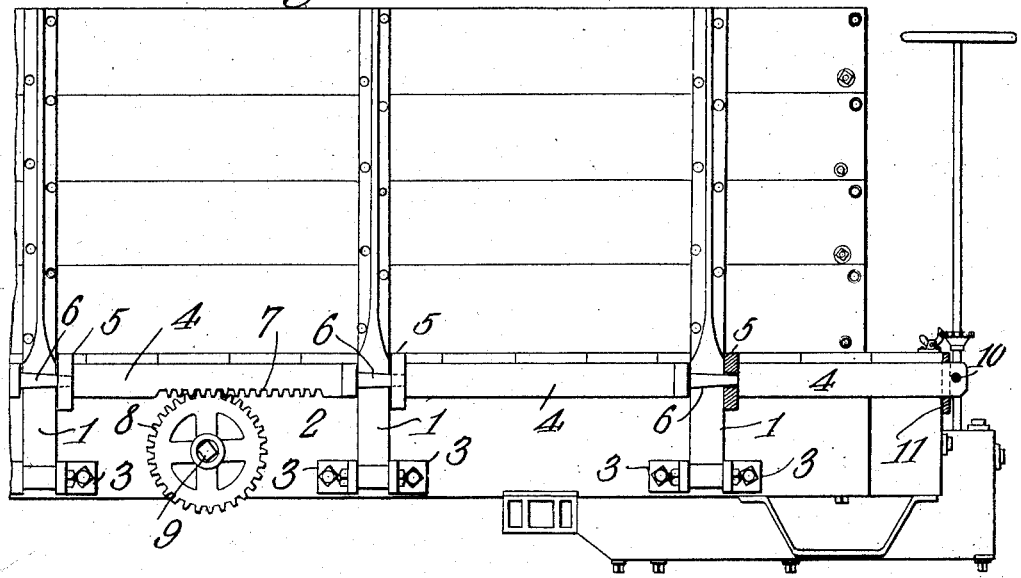
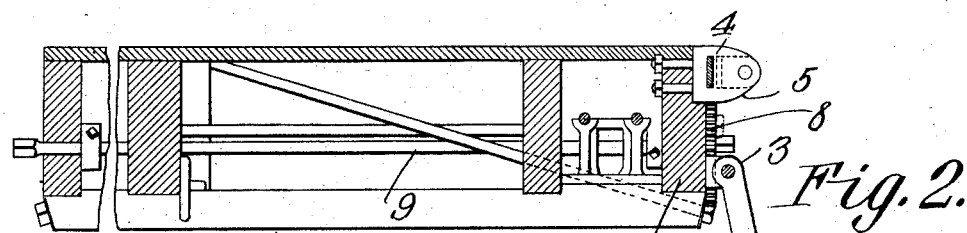
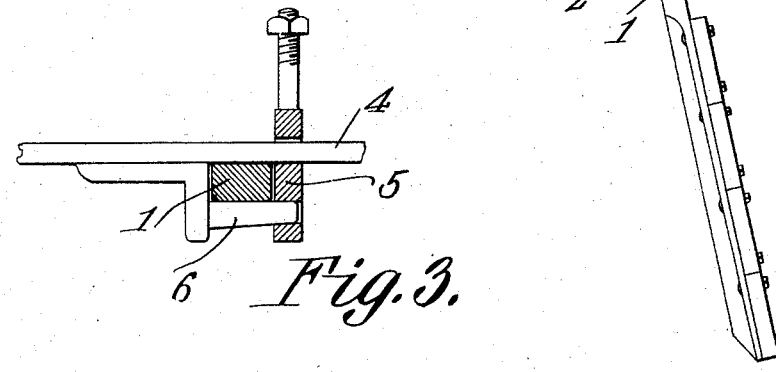
WITNESSES:
William H. Baker,
INVENTOR.
By C. A. Snow & Co.
ATTORNEYS

UNITED STATES PATENT OFFICE.

WILLIAM H. BAKER, OF OLYMPIA, WASHINGTON.

CAR-STAKE.

No. 864,221.  Specification of Letters Patent.  Patented Aug. 27, 1907.

Application filed December 29, 1906. Serial No. 350,019.

*To all whom it may concern:*

Be it known that I, WILLIAM H. BAKER, a citizen of the United States, residing at Olympia, in the county of Thurston and State of Washington, have invented a new and useful Car-Stake, of which the following is a specification.

This invention relates to load-retaining means for vehicles, and especially to means whereby pivoted side stakes upon platform and logging cars may be held in vertical position against the pressure of a load or may be easily released from a position of safety.

The purpose of this invention is to provide a device of the character described that may be easily constructed and applied to any car and that will be durable and effective in operation.

In the accompanying drawing of this device: Figure 1 is a front elevation showing the device in load-retaining position attached to the sill of a car; and Fig. 2 is an end elevation of the same showing the device in load-releasing position. Fig. 3 is a top plan view of a portion of the lock bar and pin and showing the adjacent side post and bracket in section.

Referring to the drawing, the side stakes 1 are pivotally attached at their lower ends to the sides 2 of the car by means of the brackets 3 and their free ends are held in vertical position by the lock bar 4 which is slidably mounted against the outside of the car, parallel to and near the upper edge thereof, in the brackets 5—5 which are rigidly secured to the sides of the car and adjacent to the said stakes. The lock bar carries the locking pins 6—6 rigidly secured thereto by means of lugs and adapted to engage in recesses in the outer ends of the said brackets supporting said lock bar, to inclose the side stakes when in their vertical positions and to retain them against the pressure of a load. The lower edge of said lock bar is toothed along its central portion to form a rack 7; a gear wheel 8, meshing with said rack, is mounted upon a shaft 9 passing through the sides of the car and journaled therein; the ends of said shaft are adapted to receive a removable crank or wrench whereby the shaft may be turned, rotating the gear and moving the lock bar longitudinally of the car and carrying the locking pins into or out of engagement with the recesses in the lock bar supporting brackets.

The lock bar is positively retained in a position adapted to lock the side bars against the pressure of a load by means of a pin 10 removably placed in a hole in the bar adjacent a bracket 11 through which the bar passes and which is secured to the end of the car.

In order to insure safety, the lock bar is operated from the side of the car opposite to that to which it is attached when it is desired to release the side stakes from a load, but in locking the stakes when the car is unloaded the bar may be more conveniently operated from the same side to which it is attached. It is obvious that the construction shown in the drawing upon one side of the car only may be applied to both sides if so desired.

Having thus described the invention, what is claimed and desired to be secured by Letters Patent is:—

1. In a load-retaining means for vehicles, the combination with a load-bearing structure, of a side post pivotally secured thereto, a recessed bracket secured to said structure adjacent the post, a bar slidably mounted in the bracket transversely of said side post, a locking pin rigidly secured to the bar opposite said bracket, means for operating said locking bar to cause the locking pin to engage or disengage with said bracket, and means for locking the bar when the pin is in engagement with the bracket.

2. In load-retaining means for vehicles, the combination with a load-bearing structure, of a side post pivotally connected thereto, a recessed bracket secured to said structure adjacent the post, a rack bar slidably mounted in said bracket transversely of said post, a locking pin rigidly secured to said bar opposite the bracket, a gear wheel engaging said rack, and means for rotating said gear.

3. In load-retaining means for vehicles, the combination with a load-bearing structure, of a side post pivotally connected thereto, a recessed bracket secured to said structure adjacent to the post, a rack bar slidably mounted in said bracket transversely of the post, a locking pin rigidly secured to the bar opposite the bracket, a gear wheel engaging said rack, and a shaft carrying said gear wheel and journaled in and extending beyond the sides of said structure and having ends adapted to receive a crank or wrench.

4. In a load-retaining means for vehicles, the combination with a load-bearing structure, of a side post pivotally attached thereto, a transverse shaft journaled in said structure and extending beyond the sides thereof, a gear mounted upon said shaft, a movable rack operated by the gear, and means operated by said rack to lock or unlock the side post in a vertical position.

In testimony that I claim the foregoing as my own, I have hereto affixed my signature in the presence of two witnesses.

WILLIAM H. BAKER.

Witnesses:
 GEORGE TAYLOR,
 G. W. WHITESIDE.